United States Patent [19]

Blumenkranz et al.

[11] 4,327,895
[45] May 4, 1982

[54] BALL VALVE

[75] Inventors: James J. Blumenkranz, Los Angeles; Rowland G. Hall, Burbank, both of Calif.

[73] Assignee: R & G Sloane Manufacturing Co., Sun Valley, Calif.

[21] Appl. No.: 176,335

[22] Filed: Aug. 8, 1980

[51] Int. Cl.³ .............................................. F16K 5/06
[52] U.S. Cl. ................................... 251/315; 251/170; 137/315
[58] Field of Search ...................... 251/171, 170, 315; 137/315

[56] References Cited

U.S. PATENT DOCUMENTS

| 2,283,985 | 5/1942 | Grant | 251/170 |
| 3,209,778 | 10/1965 | Flohr | 251/170 X |
| 3,550,902 | 12/1970 | Pidgeon | 251/315 X |
| 3,653,631 | 4/1972 | Hurst | 251/170 X |
| 3,930,636 | 1/1976 | Pugh | 251/215 |

FOREIGN PATENT DOCUMENTS 1220081 5/1960 France .

Primary Examiner—Harold W. Weakley
Attorney, Agent, or Firm—Fulwider, Patton, Rieber, Lee & Utecht

[57] ABSTRACT

A ball valve having an externally threaded seal carrier, a ball, a seal disposed between the carrier and ball, a tubular valve body internally threaded to engage the external threads of the seal carrier and hold it in the body, an axial clearance between the external and internal threads to permit linear movement of the carrier, a connecting sleeve which contacts the carrier, and a union nut adjustably attached to the valve body and slidably engaging the connecting sleeve for external adjustment of the axial position of the carrier within the body to compensate for seal wear by movement of the sleeve towards the body. The carrier extends beyond the valve body to provide an adjusting space between the connecting sleeve and body to permit movement of the sleeve towards the body. The external and internal threads encircle the circumference of the carrier and the interior wall of the valve body, respectively, one and one-half times and the threads are square in cross-sectional shape and have an axial clearance of one thirty-secondth of one inch. An O-ring is disposed in an annular groove in the carrier located adjacent the external threads and toward the ball for avoiding circumferential stress on the threaded portion of the valve body.

17 Claims, 3 Drawing Figures

BALL VALVE

BACKGROUND OF THE INVENTION

The present invention relates generally to ball valves and, more particularly, to ball valves with an externally adjustable seal carrier.

Conventional ball valves generally include a tubular valve body or housing, a rotatable ball disposed within the center of the valve body, annular seals positioned on each side of the ball, and stationary or movable seal carriers for holding the seals in place and forcing the seals tightly against the surface of the ball to prevent leakage of fluid from between the seal carriers and ball. Flow passages through the ball and seal carriers allow the passage of fluid when the ball is rotated into an open position.

Seals wear from usage, and unless means are provided to compensate for the wear, the valve will begin to leak and require disassembly and replacement of the worn seals. To provide such compensating means, particularly in ball valves utilizing connecting sleeves and union nuts, some valves have at least one slidable seal carrier that is externally adjusted by movement of the union nut. Tightening of the union nut, which bears against the connecting sleeve, causes the connecting sleeve to contact and move the seal carrier toward the ball, thereby compensating for seal wear. A ball valve of this general construction is shown in U.S. Pat. No. 3,550,902.

A significant disadvantage of ball valves of this type is the inability to remove the union nut and connecting sleeve from the side of the valve with the slidable seal carrier while maintaining fluid pressure on the opposite side of the valve with the ball in a closed, fluid blocking position. Should the union nut and connecting sleeve be removed under such conditions, as is sometimes necessary to repair or replace a pipe attached to the connecting sleeve, the pressure would blow the ball and seal carrier out of the valve body.

In an attempt to solve this problem, some valves have a seal carrier with a plurality of contact-type dogs and a valve body with cooperating recesses which receive the dogs. The dogs, when inserted in the recesses and twisted, lock the seal carrier within the valve body. To provide for external adjustment of the carrier when locked, the recesses are sized to permit axial movement of the dogs within the recesses. As above, the union nut and connecting sleeve are utilized to accomplish the adjustment. A ball valve of this general construction is shown in U.S. Pat. No. 4,059,250.

Although ball valves of the dog and recess type of construction do prevent the blowout discussed above, they have a significant disadvantage in their inability to provide for adjustment of the seal carrier when the union nut and connecting sleeve are removed. Since no means are provided to hold the seal carrier firmly against the ball except for the union nut and connecting sleeve, leakage may occur when they are removed.

In another attempt to solve the blowout problem, some valves utilize a locking ring arrangement. A spring cam may also be used with this type of valve to urge the seal carrier toward the ball. These ball valves suffer from the same disadvantage as discussed above since they provide no means for adjustment of the seal carrier when the union nut and connecting sleeve are removed. Such adjustment is particularly important when the fluid pressure applied to the valve is great enough to counteract the biasing action of the spring cam. A ball valve of this general construction is shown in U.S. Pat. No. 4,023,773.

It will therefore be appreciated that there has been a significant need for a ball valve with an externally adjustable seal carrier that not only prevents blowout of the ball and seal carrier, but also provides for adjustment of the seal carrier to inhibit leakage when the union nut and connecting sleeve are removed. The present invention fulfills this need, and further provides other related advantages.

SUMMARY OF THE INVENTION

The present invention resides in a ball valve having at least one threaded seal carrier which when assembled permits external adjustment of the position of the carrier to compensate for seal wear, and when partially disassembled and under fluid pressure prevents the ball and seal carrier from being blown out of the valve and allows for adjustment of the seal carrier to stop leakage. Basically, and in general terms, the valve of the invention includes a valve body with internal threads at at least one end, a rotatable ball disposed in the body, a seal adjacent the ball, at least one movable seal carrier with external threads disposed within the body for engaging the internal threads of the body and holding the carrier in the body, an axial thread clearance between the external and internal threads to permit the linear movement of the carrier, and external adjustment means for engaging the seal carrier and adjusting its axial position within the valve.

More specifically, in the presently preferred embodiment of the invention, the adjustment means includes a connecting sleeve which engages the seal carrier and a union nut adjustably attached to the valve body and slidably engaging the connecting sleeve. The seal carrier extends beyond the valve body to provide an adjusting space and allow movement of the connecting sleeve towards the valve body to adjust the axial position of the seal carrier and compensate for seal wear.

The external threads of the seal carrier encircle the circumference of the carrier at least once and the internal threads of the valve body encircle the interior wall of the body at least once. The threads are of square shape in cross-section and have an axial clearance of one thirty-secondth of one inch. An O-ring is disposed in an annular groove in the seal carrier located adjacent the external threads and towards the ball for avoiding circumferential stress on the threaded portion of the valve body.

Other features and advantages of the invention will become apparent from the following detailed description, taken in conjunction with the accompanying drawings.

DETAILED DESCRIPTION

Figure 1:
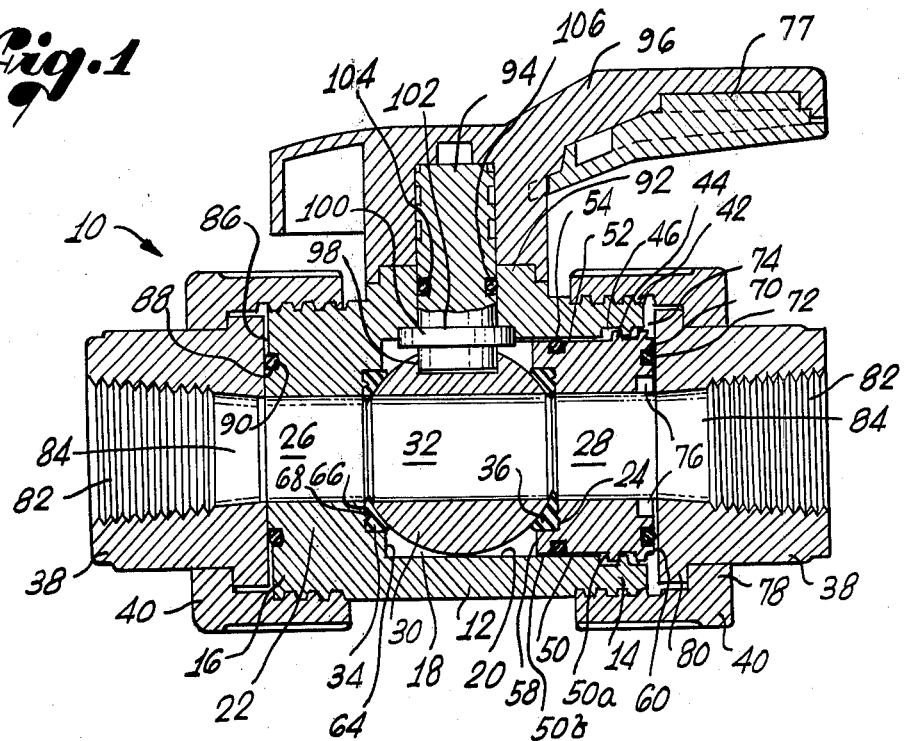
FIG. 1 is a sectional view of a ball valve embodying the present invention.

As shown in the drawings for purposes of illustration, the present invention is embodied in a ball valve, indicated generally by reference numeral 10, of the single-end-entry type. The valve 10 includes a tubular valve housing or body 12 having a first end 14 and a second end 16, with an axial chamber 18 extending between the ends and defined by a generally cylindrical interior wall 20 of the body. The valve body 12 has a radial wall 22 at its second end 16 which extends radially inward from the interior wall 20, normal to the axis of the chamber. The valve 10 further includes an axially movable seal carrier 24 disposed within the chamber 18 at the first end 14 of the valve body 12. Flow passages 26 and 28 pass through the radial wall 22 and the seal carrier 24, respectively, in axial alignment with the chamber 18.

A ball 30 having a diametrical flow passage 32 is positioned within the chamber 18, between the radial wall 22 and the seal carrier 24, and annular seals 34 and 36 are in juxtapose position with the ball, and in axial alignment with the chamber. The seal 34 is on the side of the ball 30 toward the second end 16 of the valve body 12, and the seal 36 is on the side of the ball toward the first end 14 of the valve body. A connecting sleeve 38 is positioned at each of the first and second ends 14 and 16 of the valve body 12, and extends outwardly of the ends, and a union nut 40 is adjustably attached to each of the ends for coupling the connecting sleeve to the valve body and bringing the connecting sleeve at the first end 14 into engagement with the seal carrier 24.

In accordance with the invention, the interior wall 20 of the valve body 12 has internal threads 42 at its first end 14, and the seal carrier 24 has external threads 44 for engaging the internal threads and holding the seal carrier within the valve body, to prevent blowout when the union nut 40 and connecting sleeve 38 are removed from the first end, to facilitate installation and removal of the seal carrier from the valve body, and to provide a uniformly adjustable seal pressure against the ball 30. An axial clearance 46 is provided between the internal and external threads 42 and 44 sufficient to permit linear movement of the seal carrier 24 within the chamber 18 for adjusting the axial position of the seal carrier to compensate for the wear of the seals 34 and 36 by the external adjustment of the union nut 40.

In the embodiment of the valve 10 shown in FIG. 1, the internal threads 42 and external threads 44 are square to provide added strength and ease of manufacture, and the seal carrier 24 is tubular in shape having an outer circumferential wall 50 threaded with the external threads 44 along an end portion 50a toward the first end 14 of the valve body 12. The external threads 44 extend one and one-half turns around the circumference of the wall 50.

Along an opposite end portion 50b of the wall 50, an annular groove 52 is formed to receive an O-ring seal 54 for providing a fluid-tight seal between the seal carrier 24 and the interior wall 20 of the valve body 12. Positioning of the O-ring seal 54 inward of the internal and external threads 42 and 44 eliminates the circumferential stress (or Hoop stress) on the threaded portion of the interior wall 20 of the valve body 12 that would otherwise occur as a result of the fluid pressures within the chamber 18.

The seal carrier 24 has end walls 58 and 60 through which the flow passage 28 passes. The end wall 58 faces toward the ball 30 and has an annular recess 62 surrounding and adjacent to the flow passage 28 in which the seal 36 is seated. The radial wall 22 at the second end 16 of the valve body 12 has an interiorly facing side 64 with a similar annular recess 66 surrounding and adjacent to the flow passage 26 in which the seal 34 is seated. The recesses 62 and 66 are provided with a sharp rib 68, concentric with each recess, which bites into the seals 34 and 36 and locks them in place in the recesses.

The end wall 60 of the seal carrier 24 faces toward the first end 14 of the valve body 12 and has an annular groove 70, concentric with the flow passage 28, containing an O-ring seal 72 for providing a fluid tight seal between the seal carrier 24 and the connecting sleeve 38 positioned at the first end. The seal carrier 24 is of sufficient axial length to extend beyond the first end 14 of the valve body 12, providing contact between the end wall 60 of the seal carrier and the connecting sleeve 38 to assure a tight seal and provide an adjusting space 74 between the first end and the connecting sleeve. The adjusting space 74 allows axial movement of the connecting sleeve 38 toward the valve body 12 when the union nut 40 is tightened for adjustment of the axial position of the seal carrier 24 within the chamber 18 to compensate for seal wear.

Use of a threaded seal carrier 24 facilitates installation and removal of the seal carrier from the valve body 12 by providing the mechanical advantage of a screw to overcome the friction between the interior wall 20 of the body and the O-ring 54, which in valves of other construction makes removal of the seal carrier difficult and sometimes requires disassembly of the valve. To aid in turning the seal carrier 24 when it is being installed or removed, the end wall 60 has opposing notches 76, one to each side of the flow passage 28, for cooperation with a key 77.

The internal threads 42 of the interior wall 20 of the valve body 12 extend one and one-half turns around the interior wall to provide full circumferential contact with the exterior threads 44 and provide balanced support against any axial force applied to the seal carrier 24. In larger size valves 10, where the seal carrier 24 is subject to greater axial forces, it may be necessary to extend the internal and external threads 42 and 44 more than one and one-half turns to provide sufficient thread strength to prevent shearing of the threads. The axial clearance 46 between the internal and external threads 42 and 44 may be of any suitable amount; however, an axial clearance of one-thirty-secondth of one inch has provided sufficient linear movement of the seal carrier 24 to compensate for normal seal wear.

The valve body 12 is externally threaded along a portion of the body at each of its first and second ends 14 and 16, and the union nut 40 is internally threaded to screw onto the body. A flange 78 extends radially inward from the union nut 40, normal to the axis of the chamber 18, to slidably engage a complementary outwardly extending flange 80 of the connecting sleeve 38. The connecting sleeve 38 has an interiorly threaded socket 82 serving as means for connecting pipes (not shown) to the valve 10, and has a flow passage 84 in axial alignment with the chamber 18 which connects the flow passages 26 and 28 to the pipes. The radial wall 22 at the second end 16 of the valve body 12 has an exteriorly facing side 86 with an annular groove 88, concentric with the flow passage 26, containing an O-ring seal 90 for providing a fluid tight seal between the valve body and the connecting sleeve 38 positioned at the second end.

A tubular projection 92 extends laterally from the valve body 12, between the first and second ends 14 and 16, and rotatably positioned within the projection is a valve stem 94. The stem 94 extends outwardly from the projection 92 and is connected to a handle 96, and extends inwardly from the projection into the chamber 18 and terminates in a slot 98 in the ball 30. The slot 98 runs completely across the ball 30 in a direction normal to the axis of the flow passage 32 in the ball. The handle 96 may be manipulated to rotate the ball 30 and selectively place the flow passage 32 of the ball into and out of substantial axial alignment with the chamber 18, to allow or block the passage of fluid through the valve 10, respectively. For convenience of storage and ready availability, the handle 96 is designed to receive the key 77 and to releasably hold the key when it is not in use.

The stem 94 is maintained in the projection 92, and prevented from being expelled by the fluid pressures within the chamber 18, by a shoulder 100 extending radially outward from the stem. The shoulder 100 slidably engages a complementary edge 102 formed on the interior of the projection. A circumferential groove 104 in the stem 94, along a portion of the stem within the projection 92, contains an O-ring seal 106 for providing a fluid tight seal between the stem and the projection.

Figure 2:
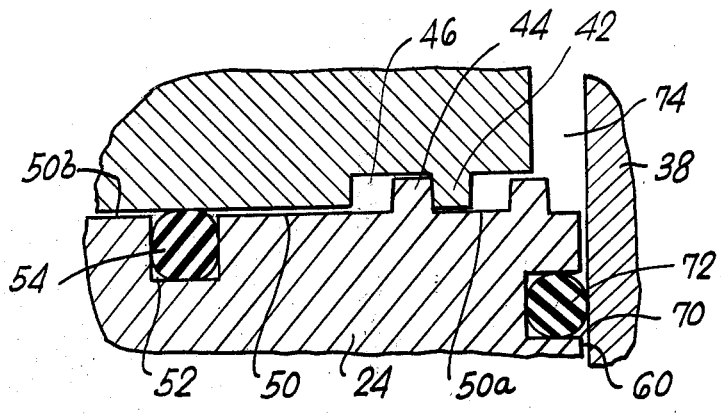
FIG. 2 is an enlarged, fragmentary, sectional view of the ball valve shown in FIG. 1, with the valve positioned to provide external adjustment.

As illustrated in FIG. 2, when the above-described parts are assembled for use, the seal carrier 24 is screwed into the valve body 12 to achieve the desired initial seal pressure on seals 34 and 36, and the connecting sleeve 38 at the first end 14 of the valve body is brought into slight contact with the end wall 60 of the seal carrier by adjustment of the union nut 40. Under such conditions, the full axial clearance 46 between the internal and external threads 42 and 44 is available for future adjustment to compensate for the wear of the seals 34 and 36. As the seals wear, the axial position of the seal carrier 24 within the chamber 18 may be externally adjusted to compensate for the wear by tightening of the union nut 40 at the first end 14 of the valve body 12.

It is to be noted that should the connecting sleeve 38 and union nut 40 be removed from the first end 14 of the valve body 12 while the ball 30 is in a closed, fluid blocking position with fluid pressure applied to the second end 16 of the valve body, the fluid pressure would force the ball towards the first end 14 and against the seal carrier 24. The seal carrier would assume the same position as illustrated in FIG. 2, with the external threads 44 of the seal carrier bearing against the internal threads 42 of the valve body 12 and preventing the seal carrier from being blown out of the valve body. To inhibit any leakage that occurs between the ball 30 and the seal 36 while the connecting sleeve 38 and union nut 40 are removed, the seal carrier 24 may be screwed into the valve body 12, using notches 76 and key 77, to increase the seal presure on the seals 34 and 36.

Figure 3:
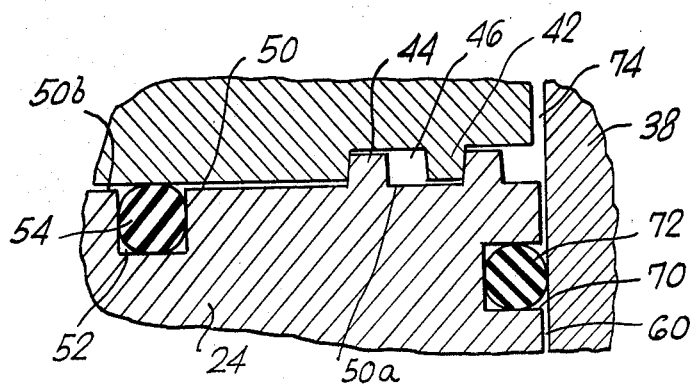
FIG. 3 is an enlarged, fragmentary, sectional view of the ball valve shown in FIG. 1, showing the valve after full external adjustment has been made.

As illustrated in FIG. 3, external adjustment of the axial position of the seal carrier 24 in the assembled valve 10 may be made as necessary to compensate for seal wear until the external threads 44 of the seal carrier bear against the internal threads 42 of the valve body 12 and prevent further inward linear movement of the seal carrier. When no further external adjustment is available, the connecting sleeve 38 and union nut 40 may be removed from the first end 14 of the valve body 12 and the seal carrier 24 screwed farther into the valve body to set the desired initial seal pressure on the seals 34 and 36. Upon reassembly, the axial position of the seal carrier 24 will again be externally adjustable to the full extent of the axial clearance 46.

From the foregoing, it will be appreciated that the invention, as described herein for purposes of illustration, provides an externally adjustable seal carrier which will prevent blowout and allow adjustment of the seal carrier to inhibit leakage when the union nut and connecting sleeve are removed with fluid pressure on the valve. It will also be appreciated that, although specific embodiments of the invention have been described herein for purposes of illustration, various modifications may be made without departing from the spirit and scope of the invention. Accordingly, the invention is not limited except as by the appended claims.

We claim:

1. A ball valve comprising:
   a valve body having a first end and a second end with an internal axial chamber extending between said ends, and having internal threads at said first end;
   a ball having a flow passage, said ball being disposed within said chamber and spaced from said first and second ends, and being rotatable to permit selective placement of said ball flow passage in and out of substantial axial alignment with said chamber;
   seal means located within said chamber between said ball and said first end, and adjacent said ball;
   an axially movable seal carrier disposed within said chamber between said seal means and said first end, said carrier having external threads for engaging said internal threads of said body, with an axial thread clearance between said external and internal threads sufficient to permit linear movement of said carrier within said chamber; and
   seal carrier adjustment means for adjusting the axial position of said carrier within said chamber, said adjustment means being adjustably attached to said body.

2. The ball valve of claim 1, wherein said external threads encircle the circumference of said seal carrier at least once and said internal thread encircle the interior of said chamber at least once.

3. The ball valve of claim 1, wherein said external and internal threads have a substantially square cross-sectional shape.

4. The ball valve of claim 1, wherein said axial clearance is at least one thirty-secondth of one inch.

5. The ball valve of claim 1, wherein said seal carrier has means for providing a fluid tight seal between said seal carrier and said valve body to avoid circumferential stress on said valve body in the area of said internal threads.

6. A ball valve comprising:
   a valve body having a first end and a second end with an internal axial chamber extending between said ends, and have internal threads at said first end;
   a ball having a flow passage, said ball being disposed within said chamber and spaced from said first and second ends, and being rotatable to permit selective placement of said ball flow passage in and out of substantial axial alignment with said chamber;
   an annular seal located within said chamber between said ball and said first end, and adjacent said ball, said seal being in substantial axial alignment with said chamber;
   an axially movable seal carrier disposed within said chamber between said seal and said first end, said carrier having external threads for engaging said internal threads of said body, with an axial thread clearance between said external and internal threads sufficient to permit linear movement of said carrier within said chamber;

a connecting sleeve for engaging said seal carrier, said connecting sleeve being positioned at and extending outwardly of said first end; and coupling means for coupling said connecting sleeve to said first end, said coupling means being adjustably attached to said body for positioning of said connecting sleeve relative to said first end, whereby adjustment of the position of said connecting sleeve adjusts the axial position of said seal carrier within said chamber.

7. The ball valve of claim 6, wherein said external threads encircle the circumference of said seal carrier at least once and said internal thread encircle the interior of said chamber at least once.

8. The ball valve of claim 6, wherein said external and internal threads have a substantially square cross sectional shape.

9. The ball valve of claim 6, wherein said axial clearance is at least one thirty-secondth of one inch.

10. The ball valve of claim 6, wherein said seal carrier extends beyond said first end to provide an adjusting space between said first end and said connecting sleeve.

11. The ball valve of claim 6, wherein said seal carrier has seal means located adjacent said external threads and toward said ball for providing a fluid tight seal between said seal carrier and said valve body and avoiding circumferential stress on said valve body in the area of said internal threads.

12. A ball valve comprising:

a valve body having a first end and a second end with an internal axial chamber extending between said ends, and having internal threads at said first end encircling the interior of said chamber at least once;

a ball having a flow passage, said ball being disposed within said chamber and spaced from said first and second ends, and being rotatable to permit selective placement of said ball flow passage in and out of substantial axial alignment with said chamber;

an annular seal located within said chamber between said ball and said first end, and adjacent said ball, said seal being in substantial axial alignment with said chamber;

an axially movable seal carrier disposed within said chamber between said seal and said first end, said carrier having external threads encircling the circumference of said carrier at least once for engaging said internal threads of said body, with an axial thread clearance between said external and internal threads sufficient to permit linear movement of said carrier within said chamber;

a connecting sleeve for engaging said seal carrier, said connecting sleeve being positioned at and extending outwardly of said first end; and a union nut for coupling said connecting sleeve to said first end, said union nut slidably engaging said connecting sleeve and being adjustably attached to said first end for positioning of said connecting sleeve relative to said first end.

13. The ball valve of claim 12, wherein said external and internal threads have a substantially square cross sectional shape.

14. The ball valve of claim 12, wherein said axial clearance is at least one thirty-secondth of one inch.

15. The ball valve of claim 12, wherein said seal carrier extends beyond said first end to provide an adjusting space between said first end and said connecting sleeve.

16. The ball valve of claim 12, wherein said seal carrier has seal means located adjacent said external threads and toward said ball for providing a fluid tight seal between said seal carrier and said valve body and avoiding circumferential stress on said valve body in the area of said internal threads.

17. The ball valve of claim 16, wherein said seal means includes an O-ring disposed in an annular groove in said seal carrier.

* * * * *